United States Patent

Gandarillas-Lastra et al.

[11] Patent Number: 5,994,248
[45] Date of Patent: Nov. 30, 1999

[54] OPTICAL LENSES AND PROCESSES OF MANUFACTURE

[75] Inventors: Jose Francisco Gandarillas-Lastra, Azuqueca de Henares, Spain; Benoit Trouille, La Ferte-sous-Jouarre, France

[73] Assignee: Saint-Gobain Vitrage, Courbevoie, France

[21] Appl. No.: 08/836,674

[22] PCT Filed: Sep. 24, 1996

[86] PCT No.: PCT/FR96/01486

§ 371 Date: Nov. 6, 1997

§ 102(e) Date: Nov. 6, 1997

[87] PCT Pub. No.: WO97/11918

PCT Pub. Date: Apr. 3, 1997

[30] Foreign Application Priority Data

Sep. 25, 1995 [FR] France .................................. 95 11227

[51] Int. Cl.[6] .............................. C03C 3/076; C03C 4/00
[52] U.S. Cl. ................................ 501/55; 501/65; 501/66; 501/68; 501/69; 501/70; 501/72; 65/66; 65/83; 65/68; 65/37; 65/275; 359/642; 359/722
[58] Field of Search ..................... 501/65, 66, 68, 501/69, 70, 72, 55, 900; 65/66, 83, 68, 37, 111, 275; 359/642, 722

[56] References Cited

U.S. PATENT DOCUMENTS

| 2,657,146 | 10/1953 | Kreidl .................................... 501/903 |
| 3,973,942 | 8/1976 | Coen et al. .............................. 65/83 |
| 4,091,951 | 5/1978 | Zijlstra et al. ......................... 501/70 |
| 4,177,319 | 12/1979 | Jahn ....................................... 501/72 |
| 4,284,686 | 8/1981 | Wedding ................................. 501/905 |
| 4,562,161 | 12/1985 | Mennemann et al. ................. 501/903 |
| 5,032,160 | 7/1991 | Murata et al. .......................... 65/102 |
| 5,039,631 | 8/1991 | Krashkevich et al. ................. 501/65 |
| 5,288,668 | 2/1994 | Netter ..................................... 501/65 |
| 5,324,691 | 6/1994 | Tarumi et al. .......................... 501/73 |
| 5,346,768 | 9/1994 | Winter et al. ........................... 501/70 |
| 5,350,972 | 9/1994 | Bucher et al. .......................... 501/70 |
| 5,607,886 | 3/1997 | Onozawa ................................ 501/73 |
| 5,631,195 | 5/1997 | Yanagisawa et al. .................. 501/70 |
| 5,656,559 | 8/1997 | Combes et al. ......................... 501/65 |
| 5,656,560 | 8/1997 | Stotzel et al. ........................... 501/71 |
| 5,714,422 | 2/1998 | Favrot et al. ........................... 501/70 |
| 5,721,181 | 2/1998 | Sehgal et al. ........................... 501/70 |
| 5,747,399 | 5/1998 | Kosokabe et al. ..................... 501/66 |
| 5,776,846 | 7/1998 | Sakaguchi et al. .................... 501/69 |

*Primary Examiner*—Michael Marcheschi
*Attorney, Agent, or Firm*—Oblon, Spivak, McClelland, Maier & Neustadt, P.C.

[57] ABSTRACT

The invention relates to lenses such as aspherical lenses and to a process for their manufacture. According to the invention, the lens is composed of a glass matrix including the constituents below in the following weight proportions:

| | |
|---|---|
| $SiO_2$ | 65–85% |
| $Al_2O_3$ | 0–10% |
| $B_2O_3$ | 0–20% |
| $Li_2O + Na_2O + K_2O$ | 3–20% |
| $CaO + MgO + BaO$ | 1–15% |
| $FeO + Fe_2O_3$ | 0–0.1%, | wherein the $K_2O$ content is equal to or less than 1% and the BaO content is equal to or less than 1%.

13 Claims, No Drawings

OPTICAL LENSES AND PROCESSES OF MANUFACTURE

This application is a 371 of International Application Number PCT/FR96/01486, filed Sep. 24, 1996, the entire contents of which are hereby incorporated by reference.

The invention relates to lenses such as aspherical lenses and to a process for their manufacture. Although the invention is not restricted to this type of application, it will be described more particularly with reference to the production of optical lighting and signalling units for motor vehicles. More precisely still, it will be described with reference to ellipsoidal headlamps in which one of the constituent components is an aspherical lens.

Ellipsoidal headlamps at present represent a small portion of the headlamps in the motor vehicle industry, but demand for them is growing. In fact, the new vehicle shapes and the improvements, especially in the air drag coefficients of these vehicles induce motor vehicle manufacturers to choose headlamps of this type. Ellipsoidal headlamps are smaller in bulk, at least insofar as their height is concerned, and thus offer greater freedom in producing the front of the vehicles and more particularly the shape of the bonnet. It is thus possible to improve the vehicle aerodynamics and to allow the vehicle shapes to evolve according to the present proposals of the body designers. Moreover, the lighting quality of ellipsoidal headlamps is appreciably superior to that of parabolic headlamps which are used more commonly; the emitted light transmission is in fact clearly superior with ellipsoidal headlamps.

Such lenses have already been produced for motor vehicle applications and more precisely for producing ellipsoidal headlamps. To produce these lenses it is known to employ glass compositions which are usual in the case of optical applications.

One composition of this type is, for example, the extra-white glass marketed by the Schott company with reference B270, the weight contents of which are the following:

70.3% $SiO_2$
9.0% $Na_2O$
7.5% $K_2O$
10.0% $CaO$
2.5% $BaO$
0.2% $MgO$
0.5% $Sb_2O_3$

Such glasses are characterized especially by a transmission in the visible which is higher than 80% and refractive indices, at the various wavelengths, which are close to one another. The compositions differ especially in the presence of $K_2O$ and of $BaO$, this latter oxide making it possible in particular to modify the refractive index without affecting the scattering coefficient, thus avoiding blurring of the images such as a chromatic aberration. These glasses are also characterized by their surface quality, having undergone a treatment of the fire-polishing type. In addition, these glasses exhibit virtually no impurities or bubbles which can give rise to scatter and hence dazzling, and the composition does not contain any iron, since the latter produces an absorption at certain wavelengths.

It turns out that the quality of these glasses, more particularly their surface quality, requires relatively costly specific treatments. Similarly, the composition of these glasses and especially the components which contribute more particularly to the optical properties are relatively costly components. Consequently, the cost of these optical glasses is very high and this in most cases limits the use of these lenses for ellipsoidal headlamps intended for top-range motor vehicles.

The inventors have set themselves the task of producing lenses exhibiting good transmission in the visible, that is to say higher than 80%, and refractive indices at the various wavelengths which are close to one another.

Another objective of the invention is to produce these lenses at a cost which is lower than that of the lenses currently produced.

These aims are attained according to the invention by a lens composed of a glass matrix including the constituents below in the following weight proportions:

| | |
|---|---|
| $SiO_2$ | 65–85% |
| $Al_2O_3$ | 0–10% |
| $B_2O_3$ | 0–20% |
| $Li_2O + Na_2O + K_2O$ | 3–20% |
| $CaO + MgO + BaO$ | 0–15% |
| $FeO + Fe_2O_3$ | 0–0.1%, | the $K_2O$ content remaining equal to or lower than 1% and the $BaO$ content remaining equal to or lower than 1%.

This glass matrix may also comprise impurities, especially those introduced by the vitrifiable raw materials, it not being permissible for the content of these to exceed 1%.

Such a glass matrix is, for example, a matrix usually employed for the production of plate glass using the float technique. This is, for example, the glass matrix including the constituents below in the following weight proportions:

| | |
|---|---|
| $SiO_2$ | 71.4% |
| $Al_2O_3$ | 0.6% |
| $Na_2O$ | 13.7% |
| $CaO$ | 9.6% |
| $MgO$ | 4.0%. |

According to a first alternative form of the invention the lens is composed of a glass matrix of the silica-soda-lime type including the constituents below in the following weight proportions:

| | |
|---|---|
| $SiO_2$ | 65–75% |
| $Al_2O_3$ | 0–10% |
| $Li_2O + Na_2O + K_2O$ | 8–18% |
| $CaO + MgO + BaO$ | 5–15% |
| $FeO + Fe_2O_3$ | 0–0.1%, | the $K_2O$ content remaining equal to or lower than 1% and the $BaO$ content remaining equal to or lower than 1%.

Silica $SiO_2$ is the main component forming the vitreous lattice. Its content is therefore large and preferably higher than 72%. Since $SiO_2$ is a component which is difficult to melt, the viscosity being very high at high contents, it will preferably not exceed 74%.

$Al_2O_3$ makes it possible to stabilize the vitreous lattice to be developed and takes part in the constitution of the said lattice. The content is preferably not zero but preferably remains lower than 3%; beyond this $Al_2O_3$ can become detrimental for the mechanical properties of the glass.

Alkali metal components promote in particular the melting of the composition; they are spoken of as fluxes. $Na_2O$ is mainly employed, especially for reasons of cost, since it is inexpensive. However, alkaline materials have a negative effect on mechanical strength and chemical resistance; their content will be preferably lower than 16% and preferably higher than 13%, since these components contribute to a decrease in the viscosity.

The alkaline-earth components, while also facilitating the melting of the glass, act essentially as a stabilizer of the glass structure, by increasing chemical stability and mechanical strength. These components also contribute to improving the working range and hence the mouldability; CaO is chiefly employed. The alkaline-earth contents will be advantageously higher than 8% and lower than 11%.

The content of iron oxide (ferrous or ferric) is advantageously lower than 0.1%, since this component alters the colour of the glass.

The lens according to the invention is thus advantageously composed of a glass matrix of the silica-soda-lime type including the constituents below in the following weight proportions:

| | |
|---|---|
| $SiO_2$ | 72–74% |
| $Al_2O_3$ | 1–3% |
| $Li_2O + Na_2O + K_2O$ | 13–16% |
| $CaO + MgO + BaO$ | 8–11% |
| $FeO + Fe_2O_3$ | 0–0.1%. |

According to a second alternative form of the invention the lens is composed of a glass matrix of the borosilicate type including the constituents below in the following weight proportions:

| | |
|---|---|
| $SiO_2$ | 65–85% |
| $B_2O_3$ | 10–20% |
| $Li_2O + Na_2O + K_2O$ | 3–20% |
| $Al_2O_3$ | 0–5%, | the $K_2O$ content remaining equal to or lower than 1%.

Such lenses are, for example, produced from one of the compositions A and B including the constituents below in the following weight proportions:

| | A | B |
|---|---|---|
| $SiO_2$ | 80 | 81 |
| $B_2O_3$ | 13 | 13 |
| $Na_2O$ | 4.1 | 3.6 |
| $Al_2O_3$ | 2.2 | 2.2 |

The tests carried out have shown that the compositions thus defined according to the invention satisfy the specified requirements for the production of lenses and more particularly of aspherical lenses employed for the production of ellipsoidal headlamps intended to be fitted to motor vehicles. A lens produced from such a composition exhibits especially a transmission corresponding to the visible spectrum which is higher than 80%. In addition, it exhibits a low scatter of the refractive indices at the various wavelengths. Furthermore, tests in a confined environment simulating a use of these lenses in a motor vehicle headlamp have shown that the lenses according to the invention exhibit a good resistance to corrosion.

These compositions can therefore be employed, surprisingly, to manufacture lenses and are particularly advantageous from a point of view of cost, especially where compositions of silica-soda-lime type are concerned, because the costly components such as BaO or $K_2O$ are present in a very small quantity when they exist.

This type of composition, usually employed for more ordinary applications such as the manufacture of plate glass or else of household glassware, for example glasses or tumblers, ordinarily does not undergo any specific preparation or particular finishing stages such as polishing.

It has become apparent, surprisingly, that the lenses according to the invention can also be produced in an ordinary manner, that is to say with few precautions, especially during the melting, and do not require any finishing of the fire-polishing type during the production. It turns out that this simplification in manufacture with regard to the compositions referred to above also contributes to obtaining lenses at a cost which is lower than that of those manufactured according to the prior art.

The invention also proposes a process for the manufacture of the lenses which have just been described.

This process for the manufacture of lenses consists in heating at least one glass component to the temperature corresponding to a logarithmic viscosity of between 4.5 and 5.5 and preferably equal to 5, and in pressing the said component.

According to a first alternative form of the invention the glass component is the end of a rod prepared beforehand. The process then consists in heating the end of the glass rod by placing the latter in a furnace and when the intended temperature is reached the hot end is placed between two half-moulds. The pressing is then performed so that the glass fills the cavity of the mould. Next, in order to detach the pressed component from the remainder of the rod, this rod is pulled while the mould is still closed, to create a neck and to shear, with the aid of shears, the glass rod and to place it back to heat in the furnace. This process is difficult to automate, since most of the stages must be performed by an operator. In addition, the principle of this process prohibits total closing of the mould during the pressing, since the pressed component still forms a part of the rod. This particular feature entails a higher glass usage than that needed for producing the lens, since a portion of the glass will spill out through the opening of the mould during the pressing; that is to say that it is necessary to provide a sufficient volume of the pressed glass component, considering that a portion of the latter will run out of the mould during the pressing. In addition, an extra stage is necessary, which consists in removing the flash from the pressed lens.

According to another preferred alternative form of the invention the process consists in heating and pressing a preform, the said preform being obtained by pressing a gob of glass with the aid of a mechanical tool. Such a preform exhibits, for example, a paraboloidal shape with a rounded heel, it being possible for the latter to exhibit irregularities forming limited regions on which the said preform can rest. During the subsequent treatment, to which reference will be made again later, these regions can make it possible to limit the points of contact with the surface on which the preform is positioned. To produce these preforms it is possible to employ any type of techniques that are known to a person skilled in the art. The melting of the raw materials can, for example, be carried out in a glassmaking furnace of the continuous end-fired furnace type employing a liquid hydrocarbon as energy input or else, for example, an electrical furnace. The molten gas can then be led through a channel or feeder to one end of this channel, also called an orifice ring, at which, for example, a plunger associated with a shearing mechanism can form a gob of glass, also called a parison. The device is designed so as to obtain a parison the weight of which is that desired for the preform. The weight and the geometry are defined beforehand by those of the lens which it is intended to produce. The parison can next be taken to a moulding device, for example such as those usually employed in the tumbler or bottle manufacturing industry. The preforms thus produced can be stored with a view to the manufacture of lenses.

A preferred embodiment of the invention for producing lenses from preforms consists in pressing the latter after the said preforms have been heated to a temperature corresponding to a decimal logarithmic viscosity of between 4.5 and 5.5. In the case of a composition of the silica-soda-lime type, the heating of the preform is carried out, for example, in two successive operations; in a first step the temperature of the glass is raised to a temperature of between 300 and 600° C. and preferably equal to 500° C. This first operation is spread over a period of approximately thirty minutes and makes it possible to avoid any risk of degradation of the preform, such as the formation of splinters due to a thermal shock. In a second step the preform is heated for a period of less than 10 minutes to a temperature of between 750 and 1100° C. and preferably equal to 890° C. During the heating of the preforms the base of the said preform adheres to the surface of the material in contact with it, for example to the material constituting the seat of the glory hole. The invention advantageously provides a material permitting a subsequent separation. The invention thus provides for the seat of the furnace or any other component in contact with the preform, especially during the reheating stage to be produced with one or more of the following materials: chromium oxide, silicon nitride, boron nitride and graphite. It is also possible to provide an inert or reducing atmosphere prevailing within the furnace enclosure to avoid any risk of oxidation of the materials. When the preform has thus been brought to a logarithmic viscosity of between 4.5 and 5.5, it is pressed to obtain the intended lens.

According to a preferred embodiment of the invention the preform is placed on a support during the heating and pressing operations and during the transfer from one operation to the other.

Such an implementation of the process for the manufacture of a lens makes it possible to avoid any contact with the surface of the lens intended to form the aspherical surface after pressing. The absence of contact with this surface makes it possible to guarantee the absence of any marks or distortions which would be produced, for example, by a grab tool for transferring the preform from one working station to another.

This particular feature makes it possible to obtain an aspherical surface such as desired immediately after pressing; more precisely, this surface will not require any subsequent reworking as could have been the case if there were defects.

Furthermore, the choice of a material from among those listed above for producing the support makes it possible to limit the reworking thickness of the lens formed in contact with it. Tests have shown that contamination over a depth of the order of a millimeter could be reached.

Subsequently it is therefore possible to envisage only a single reworking, for example by polishing the surface in contact with the support. The invention advantageously provides for reworking over a thickness smaller than 3 mm.

Also in order to limit as much as possible this subsequent stage of reworking in thickness on the surface in contact with the support, the invention advantageously provides for an optimized volume of the preform, the latter preferably having a paraboloidal shape, in order to limit the flash during the pressing. This optimized volume also has the advantage of an economy of material.

In this manner, and according to a preferred embodiment of the invention, the preform is placed, on its rear face, in contact with a support and, after the heating stage an upper mould covers the preform to press it and to give it the intended aspherical shape. Since the preform has only a volume that is slightly greater than that of the volume of the aspherical lens which it is desired to produce, only a very thin flash appears between the support and the upper mould and hence at the base of the lens. This flash thus has the advantage of being capable of being removed during the reworking of the rear face of the lens.

Following the pressing stage, the lens can undergo an annealing stage.

According to the preferred embodiment in which the preform is associated with a support, during the transfer towards, for example, an annealing lehr and during the annealing stage, the lens obtained after pressing remains advantageously associated with the support.

The lenses obtained according to this process have effectively the characteristics required especially with a view to an application for ellipsoidal headlamps. They have in particular a good transmission in the visible and refractive indices which are not highly dispersed. Furthermore, the process does not comprise any tricky stage that could result in excessively high costs. In fact, neither the preform nor the lens are subjected in particular to any costly polishing stage such as a polishing of the fire-polishing type. In addition, the melting stage remains as conventional as can be. Only the rear face of the lens, that is to say the planar face, may undergo a softening and a polishing, which remain conventional and low-cost operations. The invention therefore advantageously envisages that the preform should have a weight which is at least 15% greater, so as to compensate the losses of material due to the polishing.

Tests and measurements have been performed on aspherical lenses intended to be employed for ellipsoidal headlamps. These lenses have been manufactured from the composition including the constituents below in the following weight proportions:

| | |
|---|---|
| $SiO_2$ | 73.50% |
| $Al_2O_3$ | 1.60% |
| $Na_2O$ | 14.50% |
| CaO | 10.00%. |

The tests are carried out on lenses which have a diameter of 64 mm and a weight of 80 g. To manufacture such a lens provision is made for employing a preform of 100 g, which corresponds to a weight 25% greater than that of the lens. Since the density of the glass is 2.50 g/cm$^3$, it is possible to determine the volume of the preform, which is 40 cm$^3$.

It is thus possible to design a mould for producing the preform by giving it the shape to which reference has been made above.

Measurements have been performed on lenses produced in this manner. First of all, it has become apparent that the transmission in the visible spectrum is higher than 80%.

Furthermore, measurements of the refractive index, in relation to that of the ambient air, have been carried out. The mean index is equal to $1.51741 \pm 5 \times 10^{-5}$. Measurements of the refractive index Ni were also performed at three different wavelengths $\lambda_i$:

| | |
|---|---|
| $\lambda_1$ = 480 nm | N1 = 1.52378 ± 5 × 10$^{-5}$ |
| $\lambda_2$ = 589 nm | N2 = 1.51716 ± 5 × 10$^{-5}$ |
| $\lambda_3$ = 644 nm | N3 = 1.51500 ± 5 × 10$^{-5}$ |

These results show that the glass has low dispersion. In addition, the constringence, which allows the dispersion of a substance to be characterized, has also been measured; this is equal to 61, which characterizes a substance of low dispersion.

These tests and measurements show that the lens produced according to the invention satisfies the specified requirements, especially those for the production of aspherical lenses employed in ellipsoidal headlamps. Furthermore, the glass composition according to the invention enables these lenses to be produced at a relatively low cost, the components chosen being inexpensive. In addition, the raw materials which are at the source of the said composition can partially or even totally include recycled glasses, and this can further limit the costs.

Similarly, the process of manufacture according to the invention, which includes only relatively conventional stages, especially where melting is concerned, and the stages of improvement of the surface quality, of the fire-polishing type, which are virtually nonexistent, also result in limiting the costs of manufacture of these lenses.

We claim:

1. An ellipsoidal headlamp lens, comprising a glass matrix consisting essentially of the constituents below in the following weight proportions:

| | |
|---|---|
| $SiO_2$ | 65–85% |
| $Al_2O_3$ | 0–10% |
| $B_2O_3$ | 0–20% |
| $Li_2O + Na_2O + K_2O$ | 3–20% |
| $CaO + MgO + BaO$ | 0–15% |
| $FeO + Fe_2O_3$ | 0–0.1%, | wherein the $K_2O$ content is equal to or lower than 1% and the BaO content is equal to or lower than 1%, said headlamp lens exhibiting a light transmission corresponding to the visible spectrum higher than 80%.

2. The ellipsoidal headlamp lens according to claim 1, wherein the CaO content is at least higher than 7%.

3. The ellipsoidal headlamp lens according to claim 1 wherein the glass matrix is a silica-soda-lime glass and consists essentially of the constituents below in the following weight proportions:

| | |
|---|---|
| $SiO_2$ | 65–75% |
| $Al_2O_3$ | 0–10% |
| $Li_2O + Na_2O + K_2O$ | 8–18% |
| $CaO + MgO + BaO$ | 5–15% |
| $FeO + Fe_2O_3$ | 0–0.1%, | wherein the $K_2O$ content is equal to or lower than 1% and the BaO content is equal to or lower than 1%.

4. The ellipsoidal headlamp lens according to claim 1 wherein the glass matrix is a silica-soda-lime glass and consists essentially of the constituents below in the following weight proportions:

| | |
|---|---|
| $SiO_2$ | 72–74% |
| $Al_2O_3$ | 1–3% |
| $Li_2O + Na_2O + K_2O$ | 13–16% |
| $CaO + MgO + BaO$ | 8–11% |
| $FeO + Fe_2O_3$ | 0–0.1%, | wherein the $K_2O$ content is equal to or lower than 1% and the BaO content is equal to or lower than 1%.

5. The ellipsoidal headlamp lens according to claim 1 wherein the glass matrix consists essentially of the constituents below in the following weight proportions:

| | |
|---|---|
| $SiO_2$ | 73.50% |
| $Al_2O_3$ | 1.60% |
| $Na_2O$ | 14.50% |
| CaO | 10.00%. |

6. The ellipsoidal headlamp lens according to claim 1 wherein the glass matrix consists essentially of the constituents below in the following weight proportions:

| | |
|---|---|
| $SiO_2$ | 71.40% |
| $Al_2O_3$ | 0.6% |
| $Na_2O$ | 13.7% |
| CaO | 9.6% |
| MgO | 4.0%. |

7. The ellipsoidal headlamp lens according to claim 1 wherein the glass matrix is a borosilicate glass and consists essentially of the constituents below in the following weight proportions:

| | |
|---|---|
| $SiO_2$ | 65–85% |
| $B_2O_3$ | 10–20% |
| $Li_2O + Na_2O + K_2O$ | 3–20% |
| $Al_2O_3$ | 0–5%, | wherein the $K_2O$ content is equal to or lower than 1%.

8. The ellipsoidal headlamp lens according to one of the preceding claims, wherein it is aspherical.

9. Process for the manufacture of an ellipsoidal headlamp lens according to claim 1, wherein at least one glass component is heated to a temperature corresponding to a decimal logarithmic viscosity of between 4.5 and 5.5 and pressed.

10. Process according to claim 9, wherein the glass component is the end of a rod.

11. Process according to claim 9, wherein the glass component is a preform obtained by pressing a glass gob metered with a plunger having an orifice ring forming the end of a feeder.

12. Process according to claim 11, wherein the preform has a weight which is at least 15%, greater than that of the lens.

13. Process according to claim 11, wherein the preform is placed on a support during heating and pressing.

* * * * *